US012730346B2

(12) United States Patent
Ouyang et al.

(10) Patent No.: US 12,730,346 B2
(45) Date of Patent: Sep. 8, 2026

(54) CONDUCTIVE BASE STRUCTURE, ELECTROCHROMIC DEVICE, AND ELECTROCHROMIC APPARATUS

(71) Applicant: GUANGYI INTELLIGENT TECH (SUZHOU) CO., LTD, Jiangsu (CN)

(72) Inventors: Tianhong Ouyang, Jiangsu (CN); Jianyu Peng, Jiangsu (CN)

(73) Assignee: GUANGYI INTELLIGENT TECH (SUZHOU) CO., LTD., Jiangsu (CN)

( * ) Notice: Subject to any disclaimer, the term of this patent is extended or adjusted under 35 U.S.C. 154(b) by 288 days.

(21) Appl. No.: 18/428,477

(22) Filed: Jan. 31, 2024

(65) Prior Publication Data

US 2024/0241417 A1 Jul. 18, 2024

Related U.S. Application Data

(63) Continuation of application No. PCT/CN2022/101294, filed on Jun. 24, 2022.

(30) Foreign Application Priority Data

Aug. 2, 2021 (CN) ......................... 202110880224.6
Aug. 2, 2021 (CN) ......................... 202110881001.1
Aug. 2, 2021 (CN) ......................... 202110882449.5
Aug. 2, 2021 (CN) ......................... 202121786998.4

(51) Int. Cl.
*G02F 1/163* (2006.01)
*G02F 1/161* (2006.01)

(52) U.S. Cl.
CPC .............. *G02F 1/163* (2013.01); *G02F 1/161* (2013.01)

(58) Field of Classification Search
None
See application file for complete search history.

(56) References Cited

U.S. PATENT DOCUMENTS 6,373,618 B1 4/2002 Agrawal et al.
2002/0135881 A1 9/2002 Rukavina et al.
2012/0147449 A1 6/2012 Bhatnagar et al.
(Continued)

FOREIGN PATENT DOCUMENTS

CN 103261960 A 8/2013
CN 105143970 A 12/2015
(Continued)

OTHER PUBLICATIONS

International Search Report for corresponding application PCT/CN2022/101294 filed Jun. 24, 2022; Mail date Sep. 29, 2022.

*Primary Examiner* — Shan Liu
(74) *Attorney, Agent, or Firm* — CANTOR COLBURN LLP

(57) ABSTRACT

A conductive base structure includes a base body. The base body includes a first conductive base and a second conductive base that are stacked. The first conductive base and the second conductive base are configured to connect to external powers respectively. At least one sidewall of the first conductive base in a circumferential direction of the first conductive base is provided with a first groove. At least one sidewall of the second conductive base in a circumferential direction of the second conductive base is provided with a second groove. The first groove and the second groove are located on the same side of the base body.

15 Claims, 15 Drawing Sheets

(56) References Cited

U.S. PATENT DOCUMENTS

| | | | | |
|---|---|---|---|---|
| 2014/0192393 | A1 | 7/2014 | Bhatnagar et al. | |
| 2015/0346575 | A1 | 12/2015 | Bhatnagar et al. | |
| 2018/0101080 | A1 | 4/2018 | Gauthier et al. | |
| 2018/0157140 | A1 | 6/2018 | Bhatnagar et al. | |
| 2018/0196323 | A1 | 7/2018 | Wang et al. | |
| 2018/0239201 | A1 | 8/2018 | Schuberg et al. | |
| 2019/0212601 | A1* | 7/2019 | de Jong | G02F 1/1676 |
| 2020/0209698 | A1 | 7/2020 | Wang et al. | |
| 2020/0348574 | A1 | 11/2020 | Bhatnagar et al. | |
| 2022/0221765 | A1 | 7/2022 | Bhatnagar et al. | |
| 2023/0103913 | A1* | 4/2023 | Spanjers | B32B 17/10504 349/56 |
| 2024/0210780 | A1* | 6/2024 | Wang | B60J 3/04 |

FOREIGN PATENT DOCUMENTS

| | | | | |
|---|---|---|---|---|
| CN | 107340664 | A | 11/2017 | |
| CN | 108873547 | A | 11/2018 | |
| CN | 109164660 | A * | 1/2019 | G02F 1/153 |
| CN | 110088676 | A | 8/2019 | |
| CN | 211741797 | U | 10/2020 | |
| CN | 212675327 | U | 3/2021 | |
| CN | 112731720 | A | 4/2021 | |
| CN | 112965303 | A | 6/2021 | |
| CN | 213365229 | U | 6/2021 | |
| CN | 113227892 | A | 8/2021 | |
| CN | 215729206 | U | 2/2022 | |
| EP | 3444664 | A1 | 2/2019 | |
| JP | 2004505298 | A | 2/2004 | |
| JP | 2020502592 | A | 1/2020 | |
| JP | 2021047416 | A | 3/2021 | |
| KR | 102085206 | B1 | 2/2020 | |
| TW | 201231787 | A | 8/2012 | |
| TW | 201700851 | A | 1/2017 | |
| TW | 201827692 | A | 8/2018 | |
| TW | 201841036 | A | 11/2018 | |
| TW | 201932699 | A | 8/2019 | |
| TW | 202024672 | A | 7/2020 | |
| TW | 202041947 | A | 11/2020 | |
| WO | 2012078634 | A2 | 6/2012 | |
| WO | 2018119095 | A1 | 6/2018 | |
| WO | 2018156588 | A1 | 8/2018 | |
| WO | 2019006402 | A1 | 1/2019 | |
| WO | 2020142204 | A1 | 7/2020 | |
| WO | 2021209474 | A1 | 10/2021 | |

* cited by examiner

B

CONDUCTIVE BASE STRUCTURE, ELECTROCHROMIC DEVICE, AND ELECTROCHROMIC APPARATUS

CROSS-REFERENCE TO RELATED APPLICATIONS

This is a continuation of International Patent Application No. PCT/CN2022/101294, filed Jun. 24, 2022, which claims priority to Chinese Patent Application No. 202121786998.4, entitled "ELECTROCHROMIC DEVICE", Chinese Patent Application No. 202110880224.6, entitled "ELECTROCHROMIC DEVICE AND ELECTROCHROMIC APPARATUS", Chinese Patent Application No. 202110882449.5, entitled "CONDUCTIVE STRUCTURE AND ELECTROCHROMIC DEVICE" and Chinese Patent Application No. 202110881001.1, entitled "CONDUCTIVE BASE STRUCTURE AND ELECTROCHROMIC DEVICE", filed with the China National Intellectual Property Administration (CNIPA) on Aug. 2, 2021, disclosure of which are incorporated herein by reference in their entireties.

TECHNICAL FIELD

The present invention relates to the electrochromic field and, in particular, to a conductive base structure, an electrochromic device and an electrochromic apparatus.

BACKGROUND

With the rapid development of electronic components towards miniaturization, microminiaturization and integration, the design of conductive lines on a base is also optimized constantly.

In the related art, conductive lines on a conductive substrate for miniaturized electronic components are each an entire conductive line. To avoid contact between lines disposed on the conductive substrate, intricate configurations of the conductive lines on a circuit board are required. This results in a complex manufacturing process for the conductive circuit board, elevated production costs, and the potential risk of short circuits due to mutual contact.

In the related art, a common approach to avoid a short circuit between an upper busbar and a lower busbar of an electrochromic device is to place a single busbar structure on one side of the electrochromic device. This arrangement avoids the risk of short circuits arising from contact between two busbars. However, for larger electrochromic devices, this arrangement significantly diminishes the effectiveness of reducing surface resistance (referring to resistance impedance over a unit square area, typically a square area with a side length of 1 cm). Consequently, these electrochromic devices exhibit slower color-changing speed and less vibrant color transitions, significantly impacting their reliability.

SUMMARY

In view of the preceding, an object of the present invention is to provide a conductive base structure, an electrochromic device and an electrochromic apparatus to overcome the shortcomings in the related art.

An aspect of the present invention provides a conductive base structure. The conductive base structure includes a base body. The base body includes a first conductive base and a second conductive base that are stacked, where the first conductive base and the second conductive base are each configured to connect to an external power, at least one sidewall of the first conductive base in a circumferential direction of the first conductive base is provided with at least one first groove, at least one sidewall of the second conductive base in a circumferential direction of the second conductive base is provided with at least one second groove, and the first groove and the second groove are located on a same side of the base body.

Further, a plurality of first grooves and a plurality of second grooves are provided, the plurality of first grooves are spaced apart along the circumferential direction of the first conductive base, and the plurality of second grooves are spaced apart along the circumferential direction of the second conductive base.

Further, clearances are formed between orthographic projections of the first grooves on a plane on which the second conductive base is located and the second grooves, and clearances are formed between orthographic projections of the second grooves on a plane on which the first conductive base is located and the first grooves.

Further, orthographic projections of the first grooves on a plane on which the second conductive base is located partially overlap the second grooves, and orthographic projections of the second grooves on a plane on which the first conductive base is located partially overlap the first grooves.

Another aspect of the present invention provides an electrochromic device. The electrochromic device includes an electrochromic layer and the conductive base structure, where the electrochromic layer is disposed between the first conductive base and the second conductive base.

Further, a sealant layer is provided along a circumferential direction of the electrochromic layer, and the sealant layer is configured to form a seal in the circumferential direction of the electrochromic layer and secure the first conductive base and the second conductive base.

Further, the first conductive base includes a first conductive layer provided with a plurality of first conductive segments, and an orthographic projection of each of the plurality of first conductive segments on the plane on which the second conductive base is located is located in a respective one of the second grooves; the second conductive base includes a second conductive layer provided with a plurality of second conductive segments, an orthographic projection of each of the plurality of second conductive segments on a plane on which the first conductive layer is located is located in a respective one of the first grooves, and clearances are formed between orthographic projections of the first conductive segments on a plane on which the second conductive layer is located, and the second conductive segments; and the first conductive segments and the second conductive segments are each configured to connect to an external power.

Further, a sealant layer is disposed in the first grooves in a circumferential direction of the first grooves, in the second grooves in a circumferential direction of the second grooves, and on the electrochromic layer in a circumferential direction of the electrochromic layer, and clearances are formed between the sealant layer, and the first conductive segments and the second conductive segments.

Further, an orthographic projection of the each of the first grooves on a plane on which the electrochromic layer is located and an orthographic projection of each of the second grooves on the plane on which the electrochromic layer is located are spaced apart, clearances are formed between the first grooves and the second grooves, and a sealant layer is disposed in the clearances.

Further, an orthographic projection of each of the first grooves on a plane on which the electrochromic layer is located and an orthographic projection of each of the second grooves on the plane on which the electrochromic layer is located overlap each other, overlapping portions are formed between the first grooves and the second grooves, and a circumferential side of the overlapping portions is provided with a sealant layer.

Further, an overlapping portion between orthographic projections of the first conductive base and the second conductive base on a plane on which the electrochromic layer is located covers the electrochromic layer.

Further, the electrochromic device includes the first conductive base, the electrochromic layer and the second conductive base that are sequentially stacked, where the first conductive base includes a first base layer and the first conductive layer, and the first conductive layer is disposed on one side of the first base layer in proximity to the electrochromic layer; the second conductive base includes a second base layer and the second conductive layer, and the second conductive layer is disposed on one side of the second base layer in proximity to the electrochromic layer; at least one side of electrochromic device in a circumferential direction of the electrochromic device is provided with both a first busbar and a second busbar, the first busbar is electrically connected to the first conductive layer by at least one first connecting portion, and the second busbar is electrically connected to the second conductive layer by at least one second connecting portion; a clearance is formed between the first conductive base and an orthographic projection of the first busbar on the plane on which the first conductive base is located; and a clearance is formed between the second conductive base and an orthographic projection of the second busbar on the plane on which the second conductive base is located.

Further, a clearance is formed between orthographic projections of the first busbar and the second busbar on the plane on which the second conductive base is located.

Further, the first busbar is electrically connected to the first conductive segments by the first connecting portions, and the second busbar is electrically connected to the second conductive segments by the second connecting portions.

Further, the first busbar is encased with an insulating layer in a circumferential direction of the first busbar, and the second busbar is encased with an insulating layer in a circumferential direction of second busbar, and two ends of the first busbar and two ends of the second busbar are all conductive portions.

Further, the first connecting portions are encased with insulating layers in a circumferential direction of the first connecting portions, and the second connecting portions are encased with insulating layers in a circumferential direction of the second connecting portions.

Yet another aspect of the present invention provides an electrochromic apparatus. The electrochromic apparatus includes a first substrate layer, a first encapsulation layer, the electrochromic device, a second encapsulation layer and a second substrate layer that are sequentially stacked, where the first encapsulation layer and the second encapsulation layer cover the electrochromic device. In yet another aspect of the present invention, the electrochromic device is covered in the two encapsulation layers so that the electrochromic device can be encapsulated more effectively, and the disposition of encapsulation layers and substrate layers can also provide physical support for busbars in the electrochromic device to prevent the busbar from damage, breakage, or detachment from connecting portions.

Embodiments of the present invention have the following advantages: Any sidewall of the first conductive base in the circumferential direction of the first conductive base is provided with one first groove, and any sidewall of the second conductive base in the circumferential direction of the second conductive base is provided with one second groove at the same time, and a "concave-convex" structure is formed in the circumferential direction of the base body so that connecting terminals of the external power can be connected to the first conductive base via the second groove, and connecting terminals of the external power can be connected to the second conductive base via the first groove, and so that the connecting terminals of the external powers respectively connected to the first conductive base and the second conductive base can form a misalignment. Therefore, the safety and stability of respectively connecting the first conductive base and the second conductive to the external powers can be improved, the cost of conductive materials can be reduced, and a short circuit can be avoided. In the electrochromic device and the electrochromic apparatus including the electrochromic device according to the present invention, the surface resistance of the electrochromic device can be effectively reduced, and the color changing speed of the electrochromic device can be increased so that the electrochromic layer can undergo stable and uniform color changing under the action of an applied electric field.

The object, features and advantages of the present invention will be more apparent from the detailed description of the present invention in conjunction with drawings.

BRIEF DESCRIPTION OF DRAWINGS

To illustrate technical solutions in embodiments of the present invention more clearly, drawings used in the embodiments are briefly described below. It is to be understood that the drawings described below illustrate only part of the embodiments of the present invention and therefore are not to be construed as limiting the scope. Those of ordinary skill in the art may obtain other relevant drawings based on the drawings described below on the premise that no creative work is done.

REFERENCE LIST

Figure 1:
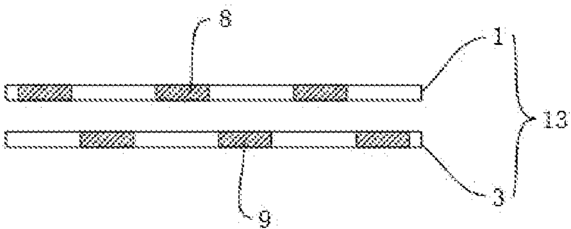
FIG. 1 is diagram one illustrating the structure of a conductive base structure according to some embodiments of the present invention taken from a viewing angle.

1-first conductive base, 2-electrochromic layer, 3-second conductive base, 4-first busbar, 5-second busbar, 6-first connecting portion, 7-second connecting portion, 8-first groove, 9-second groove, 10-first conductive segment, 11-second conductive segment, 102-first base layer, 101-first conductive layer, 302-second base layer, 301-second conductive layer, 12-sealant layer, 13-base body.

DETAILED DESCRIPTION

Embodiments of the present invention are described in detail below, and examples of the embodiments are illustrated in the drawings, where the same or similar reference numerals indicate the same or similar elements or elements having the same or similar functions. The embodiments described below with reference to the drawings are merely exemplary and intended to explain the present invention, and are not to be construed as limiting the present invention.

It is to be noted that when a component is described as being "secured to" another component, it may be directly on the particular component, or intervening components may be on the particular component. When a component is described as being "connected to" another component, it may be directly connected to the particular component, or intervening components may be connected to the particular component. Rather, when a component is described as "directly on" another component, intervening components do not exist. The terms "vertical", "horizontal", "left", "right" and the like, as used herein, are only used for an illustrative purpose.

In the present invention, unless otherwise expressly specified and limited, the term "installed", "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected between two components or interactional relations between two components. For those of ordinary skill in the art, specific meanings of the preceding terms in the present invention may be understood based on specific situations.

In addition, terms such as "first" and "second" are used only for a descriptive purpose and are not to be construed as indicating or implying relative importance or implicitly indicating the number of technical features indicated. Thus, a feature defined as a "first" feature or a "second" feature may explicitly or implicitly include one or more of such features. In the description of the present invention, the term "multiple" is defined as two or more unless otherwise expressly limited.

Unless otherwise defined, all technical and scientific terms used herein have the same meanings as those commonly understood by those skilled in the art to which the present invention pertains. Terms used in the specification of the template of the present invention are only used for describing embodiments and are not intended to limit the present invention. The term "and/or" used herein includes any or all combinations of one or more relevant items listed.

As shown in FIGS. 1, 2, 7 and 8, an embodiment of the present invention provides a conductive base structure that is mainly applied to a miniaturized, microminiaturized and integrated electronic components. The conductive base structure includes a base body 13. The base body 13 includes a first conductive base 1 and a second conductive base 3 that are stacked. The first conductive base 1 and the second conductive base 3 are mutually parallel and are configured to connect to an external power respectively.

A clearance is formed between the first conductive base 1 and the second conductive base 3 so that when the first conductive base 1 and the second conductive base 3 are simultaneously connected to the external power, an electric field can be formed between the first conductive base 1 and the second conductive base 3 to ionize electrolytes in a solution and to also enable a material having a conductive function to form a directional movement of charges under the action of the applied electric field. The external power have a positive electrode and a negative electrode. The positive electrode may be connected to the first conductive base 1 by at least one connecting terminal, and the negative electrode may be connected to the second conductive base 3 by at least one connecting terminal. Alternatively, the positive electrode may be connected to the second conductive base 3 by at least one connecting terminal, and the negative electrode may be connected to the first electrode base 1 by at least one connecting terminal.

In addition, at least one sidewall of the first conductive base 1 in a circumferential direction of the first conductive base 1 is provided with at least one first groove 8, and the number of first grooves 8 may be specifically limited according to actual situations. Similarly, at least one sidewall of the second conductive base 3 in a circumferential direction of the second conductive base 3 is provided with at least one second groove 9, and the number of second grooves 9 may be specifically limited according to actual situations. The first groove 8 and the second groove 9 are located on the same side of the base body 13 so that the first groove 8 and the second groove 9 can form a misalignment on the same side of the base body 13, and so that connecting terminals of the external power respectively connected to the first conductive base 1 and the second conductive base 3 can be misaligned and spaced apart, improving the safety of the first conductive base 1 and the second conductive base 3 being simultaneously connected to the external power.

It is to be noted that the first groove 8 may be disposed on any side of the first conductive base 1 in the circumferential direction of the first conductive base 1 or may also be disposed on any two or more sides of the first conductive base 1 in the circumferential direction of the first conductive base 1. The "more" used herein may be construed as any value greater than or equal to two and may be specifically limited according to actual situations. The number of first grooves 8 disposed on each side of the first conductive base 1 in the circumferential direction of the first conductive base 1 may be one or more to improve the diversity and the utilization rate of the base body 13.

The second groove 9 may also be disposed on any side of the edge of the second conductive base 3 or may also be disposed on any two or more sides of the edge of the second conductive base 3. The "more" used herein may be construed as a number of any value greater than or equal to two and may be specifically limited according to actual situations. The number of second grooves 9 disposed on each side of the second conductive base 3 in the circumferential direction of the second conductive base 3 may be one or more to dispose the required number of first grooves and second grooves according to different electronic components and improve the use efficiency of the base body 13.

In addition, when the circumferential direction of the first conductive base 1 is each provided with one first groove 8, and the circumferential direction of the second conductive base 3 is each provided with one second groove 9, a clearance is formed between the second groove 9 and the orthographic projection of the first groove 8 on the plane on which the second conductive base 3 is located so that power connecting terminals respectively connected to the first conductive base 1 and the second conductive base 3 can be misaligned and spaced apart, improving the safety of the first conductive base 1 and the second conductive base 3 being simultaneously connected to the external power.

The orthographic projection of the first groove 8 on the plane on which the second conductive base 3 is located may also partially overlap the second groove 9, and the connecting terminals of the external power may be electrically connected and form a misalignment through a non-overlapping portion between the orthographic projection of the first groove 8 on the plane on which the second conductive base 3 is located and the second groove 9 respectively, so that the safety of the first conductive base 1 and the second conductive base 3 being simultaneously connected to the external power can be improved.

As shown in FIGS. 29 to 32, in another embodiment of the present invention, multiple first grooves 8 and multiple second grooves 9 are provided, and the multiple first grooves 8 are spaced apart along the circumferential direction of the first conductive base 1 and form a "concave-convex" structure in the circumferential direction of the first conductive base 1. The multiple second grooves 9 are spaced apart along the circumferential direction of the second conductive base 3 and form a "concave-convex" structure in the circumferential direction of the second conductive base 3, so that connecting terminals of the external power can be connected to the second conductive base via the multiple first grooves and to the first conductive base via the multiple second grooves. Moreover, the power connecting terminals respectively connected to the first conductive base 1 and the second conductive base 3 can be misaligned and spaced apart, thereby improving the safety of the first conductive base 1 and the second conductive base 3 being simultaneously connected to the external power.

Figure 29:
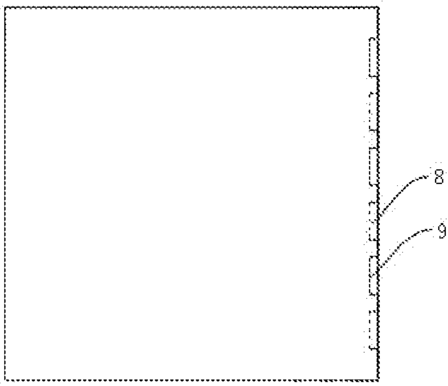
FIG. 29 is diagram one illustrating the structures of other structures of an electrochromic device according to some embodiments of the present invention taken from a viewing angle.
Figure 30:
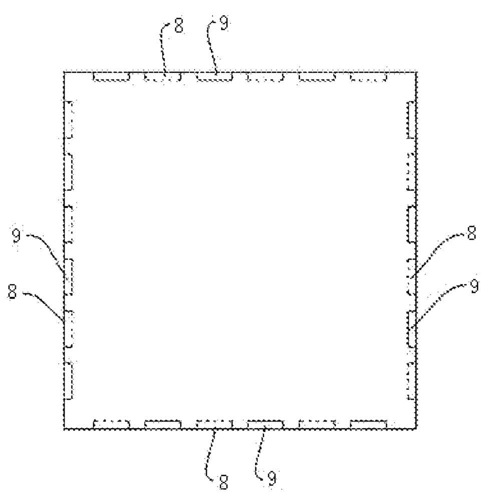
FIG. 30 is diagram two illustrating the structures of other structures of an electrochromic device according to some embodiments of the present invention taken from a viewing angle.

As shown in FIGS. 1, 29 and 30, in yet another embodiment of the present invention, to improve the safety and stability when the first conductive base 1 and the second conductive base 3 are connected to the external power, clearances are formed between the orthographic projection of the first grooves 8 on the plane on which the second conductive base 3 is located, and the second grooves 9 so that the connecting terminals of the external power can be electrically connected to the second conductive base 3 via the first grooves 8, and so that the first conductive base 1 and the connecting terminals of the external power connected to the second conductive base 3 can be spaced apart, avoiding a short circuit caused by contact between the connecting terminals of the external power and the first conductive base 1.

Meanwhile, clearances are formed between the orthographic projection of the second grooves 9 on the plane on which the first conductive base 1 is located, and the first grooves 8. In this case, the first grooves 8 and the second grooves 9 form a misaligned structure in the circumferential direction of the base body 13 so that the connecting terminals of the external power can be electrically connected to the first conductive base 1 via the second grooves 9, and so that the second conductive base 3 and the connecting terminals of the external power connected to the first conductive base 1 can be spaced apart, avoiding a short circuit caused by contact between the connecting terminals of the external power and the second conductive base 3. Meanwhile, a short circuit caused by contact between the power connecting terminals connected to the first conductive base 1 and the power connecting terminals connected to the second conductive base 3 can be avoided, so that the safety and stability between the external powers respectively connected to the first conductive base 1 and the second conductive base 3 can be improved.

Figure 2:
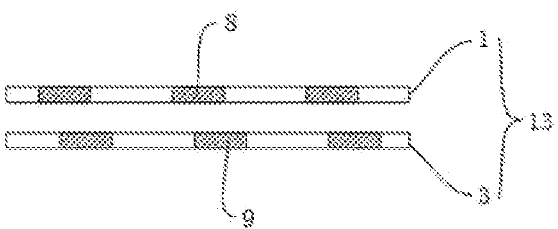
FIG. 2 is diagram two illustrating the structure of a conductive base structure according to some embodiments of the present invention taken from a viewing angle.
Figure 31:
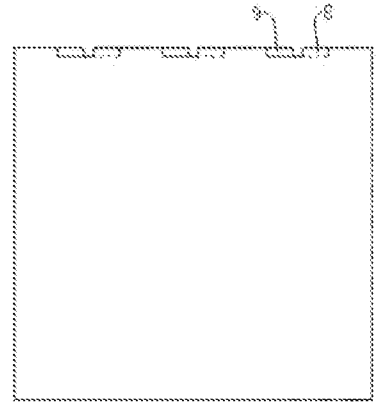
FIG. 31 is diagram three illustrating the structures of other structures of an electrochromic device according to some embodiments of the present invention taken from a viewing angle.
Figure 32:
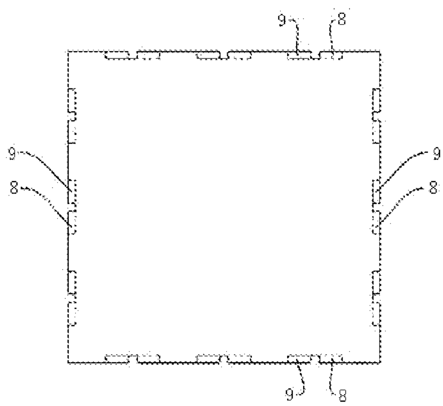
FIG. 32 is diagram four illustrating the structures of other structures of an electrochromic device according to some embodiments of the present invention taken from a viewing angle.

As shown in FIGS. 2, 31 and 32, in yet another embodiment of the present invention, to improve the safety and stability when the first conductive base 1 and the second conductive base 3 are connected to the external power, the orthographic projections of the first grooves 8 on the plane on which the second conductive base 3 is located partially overlap the second grooves 9. The orthographic projections of the second grooves 9 on the plane on which the first conductive base 1 is located partially overlap the first grooves 8. The first grooves 8 and the second grooves 9 form a misalignment structure in the circumferential direction of the base body 13.

Further, to improve the safety and stability when the first conductive base 1 and the second conductive base 3 are connected to the external power, the connecting terminals of the external power may be connected to the second conductive base 3 via non-overlapping portions between the orthographic projections of the first grooves 8 on the plane on which the second conductive base 3 is located and the second grooves 9. The connecting terminals of the external power may be connected to the first conductive base 1 through non-overlapping portions between the orthographic projections of the second grooves 9 on the plane on which the first conductive base 1 is located and the first grooves 8, so that the connecting terminals of the external power connected to the first conductive base 1 and the second conductive base 3 can form a staggered structure, and the connecting terminals of the external power connected to the first conductive base 1 and the connecting terminals of the external power connected to the second conductive base 3 can be prevented from contacting each other, thereby improving the safety and stability during the process of connecting the first conductive base 1 and the second conductive base 3 to the external power.

In addition, the second grooves 9 and the first grooves 8 may also be located on different sides of the base body 13 so that the power connecting terminals respectively connected to the first conductive base 1 and the second conductive base 3 can be misaligned and spaced apart, improving the safety of the first conductive base 1 and the second conductive base 3 being simultaneously connected to the external power.

Figure 3:
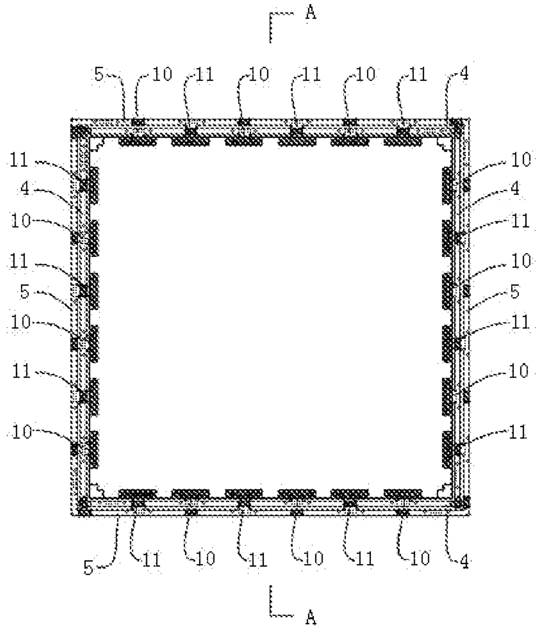
FIG. 3 is diagram one illustrating the structure of an electrochromic device according to some embodiments of the present invention taken from a viewing angle.
Figure 4:
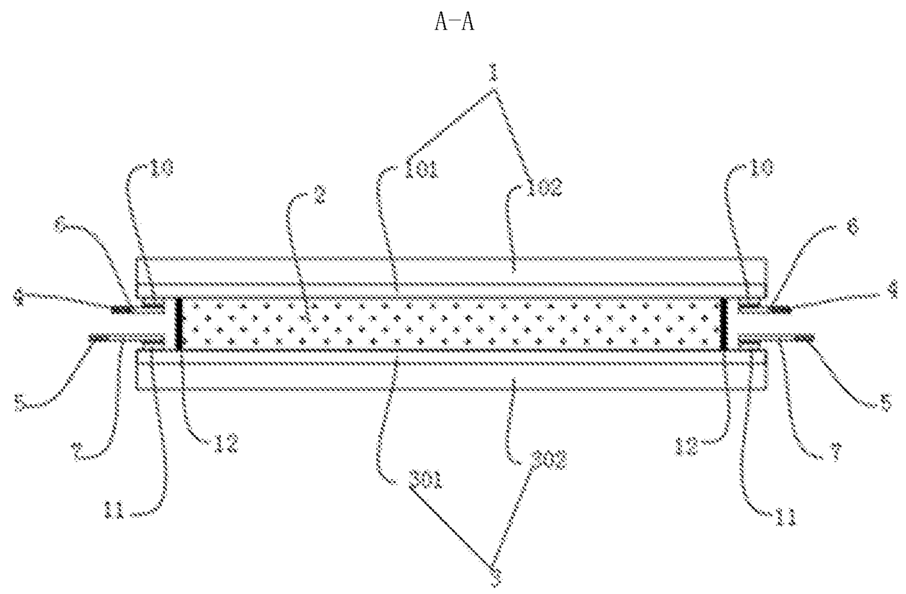
FIG. 4 is a sectional view of A-A portion of FIG. 3.

As shown in FIGS. 3 and 4, the present invention further provides an electrochromic device. The electrochromic device is mainly applied to the dimming of automatic anti-dazzle rear-view mirrors for automobiles, displays and smart glasses. Under the action of an electric field, the electrochromic device has the adjustability of light absorption and transmission and may selectively absorb or reflect external heat radiation and internal heat diffusion. The electrochromic device includes an electrochromic layer 2 and the conductive base structure in any one of the preceding embodiments. The electrochromic layer 2 is stacked between the first conductive base 1 and the second conductive base 3. The first conductive base 1 and the second conductive base 3 are simultaneously connected to the external power, an electric field can be formed between the first conductive base 1 and the second conductive base 3, and the electrochromic layer 2 connected between the first conductive base 1 and the second conductive base 3 can undergo stable and reversible color changing under the action of the electric field.

It is to be noted that the discoloration or color changing described in the present invention may be expressed as changing from one color to another color, for example, changing from red to black, or may also be expressed as changing from a transmittance to another transmittance, for example, changing from a transmittance of 30% to another transmittance of 80%.

To avoid contact between the electrochromic layer 2 and oxygen in the air and between the electrochromic layer 2 and water, a sealant layer 12 is provided in the circumferential direction of the electrochromic layer 2. The sealant layer 12 is configured to form a seal in the circumferential direction of the electrochromic layer 2 so that the sealant layer 12 can form a protection layer in the circumferential direction of the electrochromic layer 2, prevent water and oxygen from entering the electrochromic layer 2 and improve the durability of the electrochromic layer 2 during use, thereby prolonging the service life of the electrochromic layer 2.

Meanwhile, the sealant layer 12 disposed in the circumferential direction of the electrochromic layer 2 can secure the first conductive base 1 and the second conductive base 3 and improve the stability of the electrochromic layer 2 between the first conductive base 1 and the second conductive base 3, thereby improving the stability of the electrochromic layer.

As shown in FIGS. 5, 10, 12, 15 and 19, in an embodiment of the present invention, to further improve the safety and stability of connecting the first conductive base 1 and the second conductive base 3 to the external power, the first conductive base 1 includes a first conductive layer 101 provided with multiple first conductive segments 10. The multiple conductive segments 10 are configured to connect to the connecting terminals of the external power. Two or more first conductive segments 10 may be provided. The orthographic projection of each first conductive segment 10 on the plane on which the second conductive base 3 is located is located in the second groove 9, and the connecting terminals of the external power may be connected to the multiple first conductive segments 10 via the multiple second grooves 9. The multiple first grooves 8 separate the connecting terminals of the external power connected to the first conductive layer 101 to avoid a short circuit between multiple connecting terminals connected to the multiple first conductive segments 10, thereby improving the safety.

It is to be noted that the multiple first conductive segments 10 are spaced apart and may be simultaneously disposed on any side of the edge of the first conductive layer 101 or any multiple sides of the edge of the first conductive layer 101. The "multiple sides" used herein refers to any value greater than or equal to two and may be specifically limited according to actual situations. This can improve the diversity of the multiple first conductive segments 10 arranged on the first conductive layer 101 and can be used in different electronic components, thereby improving the utilization rate of the first conductive layer 101.

In addition, clearances are formed between the electrochromic layer 2 and the orthographic projections of the first conductive segments 10 on the plane on which the electrochromic layer 2 is located to avoid a short circuit caused by contact between the multiple first conductive segments 10 and the electrochromic layer 2 when the multiple first conductive segments 10 are connected to the connecting terminals of the external power, so that the safety can be improved when the multiple first conductive segments 10 are connected to the connecting terminals of the external power.

As shown in FIGS. 6, 11, 13, 16 and 23, in an embodiment of the present invention, the second conductive base 3 includes a second conductive layer 301 provided with multiple second conductive segments 11, and the multiple second conductive segments 11 are configured to connect to the connecting terminals of the external power. Two or more second conductive segments 11 are provided. The orthographic projection of each second conductive segment 11 on the plane on which the first conductive layer 101 is located is located in a respective first groove 8, the connecting terminals of the external power may be connected to the second conductive layer 301 via the first grooves 8, and the second grooves 9 separate the connecting terminals of the external power connected to the second conductive layer 301 to avoid a short circuit between multiple connecting terminals connected to the multiple second conductive segments 11, thereby improving the safety.

In addition, the multiple second conductive segments 11 are spaced apart and may be simultaneously disposed on any side of the edge of the second conductive layer 301 or any multiple sides of the edge of the second conductive layer 301. This can improve the diversity of the multiple first conductive segments 10 arranged on the first conductive layer 101 and can be used in different electronic components, improving the utilization rate of the first conductive layer 101.

Clearances are formed between the electrochromic layer 2 and the orthographic projections of the second conductive segments 11 on the plane on which the electrochromic layer 2 is located to avoid a short circuit caused by contact between the multiple second conductive segments 11 and the electrochromic layer 2 when the multiple second conductive segments 11 are connected to the connecting terminals of the external power, so that the safety can be improved when the multiple second conductive segments 11 are connected to connecting terminals of the external power.

Figure 17:
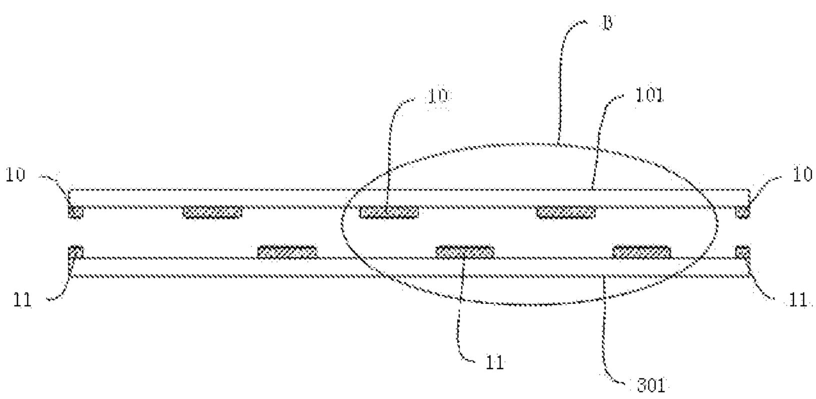
FIG. 17 is diagram four illustrating the structure of an electrochromic device according to some embodiments of the present invention taken from a viewing angle.
Figure 27:
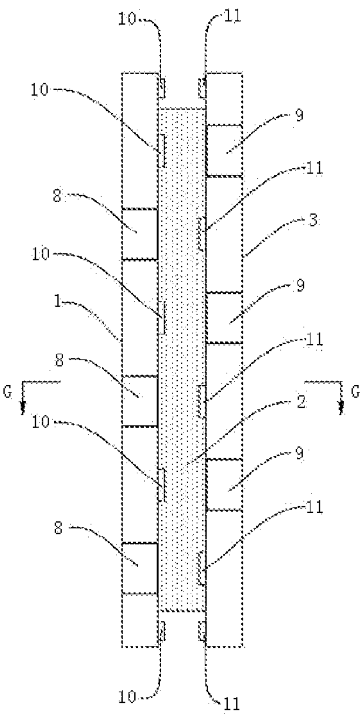
FIG. 27 is diagram six illustrating the structure of an electrochromic device according to some embodiments of the present invention taken from a viewing angle.

As shown in FIGS. 17 and 27, to further improve the safety and stability in the process of respectively connecting the multiple first conductive segments 10 and the multiple second conductive segments 11 to the connecting terminals of the external power, clearances are formed between the orthographic projections of the first conductive segments 10 on the plane on which the second conductive layer 301 is located, and the second conductive segments 11. Therefore, a staggered connecting structure can be formed in the process of respectively connecting the connecting terminals of the external power to the multiple first conductive segments 10 and the multiple second conductive segments 11 so that contact between the connecting terminals of the external power connected to the multiple first conductive segments 10 and the connecting terminals of the external power connected to the multiple second conductive segments 11 can be avoided, thereby improving the safety and stability in the process of respectively connecting the multiple first connective segments 10 and the multiple second conductive segments 11 to the connecting terminals of the external power.

A short circuit caused by contact between the connecting terminals of the external power connected to the multiple first conductive segments 10 and the second conductive layer 301 and a short circuit caused by contact between the connecting terminals of the external power connected to the multiple second conductive segments 11 and the first conductive layer 101 can also be avoided so that the safety and stability can be improved when the multiple first conductive segments 10 and the multiple second conductive segments 11 are connected to the connecting terminals of the external power. Meanwhile, the safety and stability can also be improved when the first conductive layer 101 and the second conductive layer 301 are connected to the external power.

Clearances are formed between the electrochromic layer 2 and the orthographic projections of the multiple first conductive segments 10 and the multiple second conductive segments 11 on the plane on which the electrochromic layer 2 to avoid a short circuit caused by contact between the multiple first conductive segments 10 and the multiple second conductive segments 11 and the electrochromic layer 2 in the process of respectively connecting the multiple first conductive segments 10 and the multiple second conductive segments 11 to the connecting terminals of the external power, further improving the safety and stability when the multiple first conductive segments 10 and the multiple second conductive segments 11 are connected to the connecting terminals of the external power.

It is to be understood that the multiple first conductive segments 10 and the multiple second conductive segments 11 are staggered and spaced apart along the edge of the circumferential direction of the electrochromic layer 2 respectively.

The materials of the first base layer 102 and the second base layer 302 are not specially limited and may be transparent rigid materials such as glass, or a transparent flexible material such as PET (polyethylene glycol terephthalate, polyethylene terephthalate). The materials of the first conductive layer 101 and the second conductive layer 301 is also not specially limited and may be a transparent conductive material such as an ITO (indiumtin oxide, indiumtin oxide) or a silver nanowire.

As shown in FIGS. 20 to 25, in yet another embodiment of the present invention, to further improve the protection effect on the electrochromic layer 2, a sealant layer 12 is disposed in the first grooves in a circumferential direction of the first grooves 8, in the second grooves in a circumferential direction of the second grooves 9, and on the electrochromic layer 2 in a circumferential direction of the electrochromic layer. The sealant layer 12 disposed in the circumferential direction of the first grooves 8 secures the second conductive base 3. Meanwhile, the sealant layer 12 separates the electrochromic layer 2 opposite to the first grooves 8 from the external air and water to improve the stability of the electrochromic layer 2.

To improve the protection quality of the sealant layer 12, clearances are formed between the sealant layer 12 and the first conductive segments 10 to avoid affecting the sealing quality of the sealant layer 12 in the process of connecting the first conductive segments 10 to the external power and improve the stability of the sealant layer 12 in protecting the electrochromic layer 2.

The sealant layer 12 disposed in the circumferential direction of the second grooves 9 secures the first conductive base 1 and separates the electrochromic layer 2 opposite to the second grooves 9 from the external air and water to improve the stability of the electrochromic layer 2.

To improve the protection quality of the sealant layer 12, clearances are formed between the sealant layer 12 and the second conductive segments 11 to avoid affecting the scaling quality of the sealant layer 12 in the process of connecting the second conductive segments 11 to the external power and improve the stability of the sealant layer 12 in protecting the electrochromic layer 2.

In addition, the sealant layer 12 is disposed in the circumferential direction of the electrochromic layer 2 and forms a protection layer in the circumferential direction of the electrochromic layer 2 to seal the circumferential direction of the electrochromic layer 2, avoid contact between the electrochromic layer 2 and the external air and water and improve the durability of the electrochromic layer 2 during use.

As shown in FIGS. 3, 29 and 30, in some embodiments of the present invention, the orthographic projection of the each first groove 8 on the plane on which the electrochromic layer 2 is located and the orthographic projection of the each second groove 9 on the plane on which the electrochromic layer 2 is located are spaced apart, and clearances are formed between the first grooves 8 and the second grooves 9.

In this case, the first grooves 8 and the second grooves 9 form a misalignment structure in the circumferential direction of the electrochromic layer 2.

Figure 25:
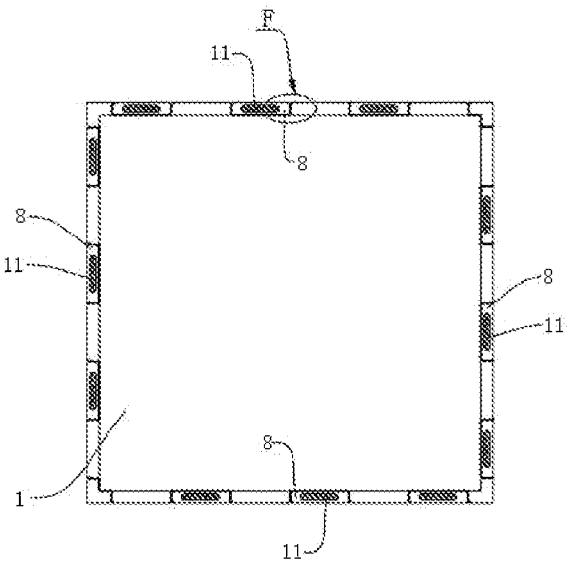
FIG. 25 is diagram seven illustrating the structure of an electrochromic device according to some embodiments of the present invention taken from a viewing angle.
Figure 26:
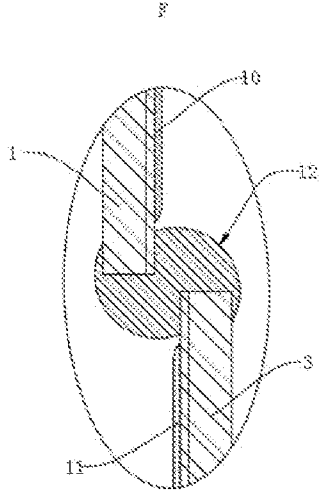
FIG. 26 is an enlarged view of F portion of FIG. 25.

In addition, as shown in FIGS. 25 and 26, a sealant layer 12 is disposed in the clearances formed between the first grooves and the second grooves 9 to separate adjacent first groove 8 and second groove 9 by the sealant layer 12. Meanwhile, the clearances formed between the first grooves and the second grooves 9 is sealed by the sealant layer 12 to separate the electrochromic layer 2 opposite to the clearances from the external air and water and form a protection layer in the circumferential layer of the electrochromic layer 2. Therefore, the stability of the electrochromic layer 2 can be improved.

As shown in FIGS. 31 and 32, in yet another embodiment of the present invention, to improve the protection effect of the sealant layer 12 on the electrochromic layer 2, the orthographic projections of the first grooves 8 on the plane on which the second grooves 9 are located partially overlap the second grooves 9 so that a misalignment structure can be formed between the first grooves 8 and the second grooves 9. In this way, the external powers respectively connected to the first conductive base 1 and the second conductive base 3 can form a staggered structure so that the external power connected to the first conductive base 1 and the external power connected to the second conductive base 3 can be prevented from contacting each other, improving the safety and stability when the first conductive base 1 and the second conductive base 3 are simultaneously connected to the external powers respectively.

Overlapping portions are formed between the first grooves 8 and the second grooves 9, and a circumferential side of the overlapping portions is provided with a sealant layer 12 to form a seal in the circumferential direction of the electrochromic layer 2 by the sealant layer 12, separate the electrochromic layer 2 from the external air and water and form a protection layer in the circumferential direction of the electrochromic layer 2. Therefore, the sealing quality of the sealant layer 12 to the electrochromic layer 2 can be improved, and the stability of the electrochromic layer 2 can be improved.

To improve the safety and stability when the first conductive layer 101 and the second conductive layer 301 are connected to the external power, the connecting terminals of the external power may be connected to the second conductive layer 301 via non-overlapping portions between the orthographic projections of the first grooves 8 on the plane on which the second conductive base 3 is located and the second grooves 9, and the connecting terminals of the external power may be connected to the first conductive layer 101 via non-overlapping portions between the orthographic projections of the second grooves 9 on the plane on which the first conductive base 1 is located and the first grooves 8. The connecting terminals of the external power connected to the first conductive layer 101 and the second conductive layer 301 form a staggered structure so that the connecting terminals of the external power connected to the first conductive layer 101 and the second conductive layer 301 can be prevented from contacting each other, and the safety and stability can be improved when the first conductive layer 101 and the second conductive layer 301 are connected to the external power.

Figure 20:
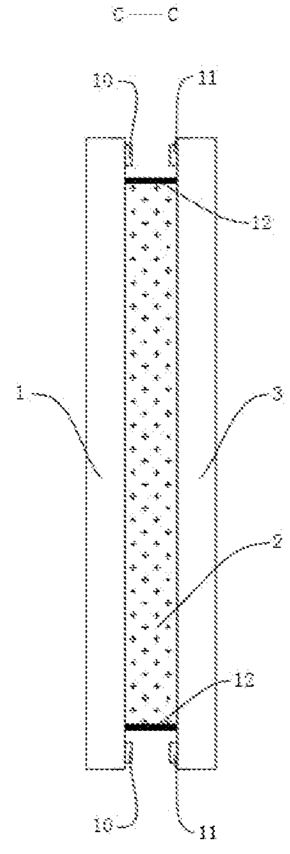
FIG. 20 is a sectional view of C-C portion of FIG. 19.
Figure 21:
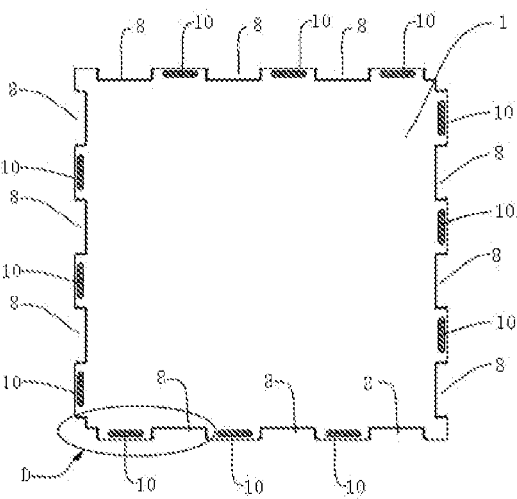
FIG. 21 is diagram two illustrating the structure of a first conductive base in an electrochromic device according to some embodiments of the present invention taken from a viewing angle.
Figure 22:
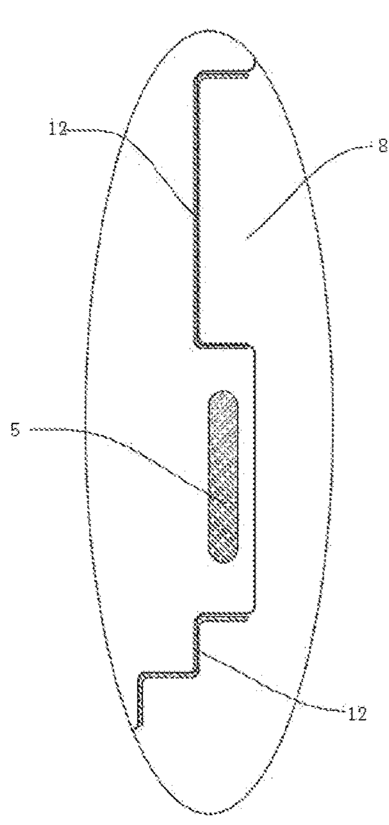
FIG. 22 is an enlarged view of D portion of FIG. 21.
Figure 23:
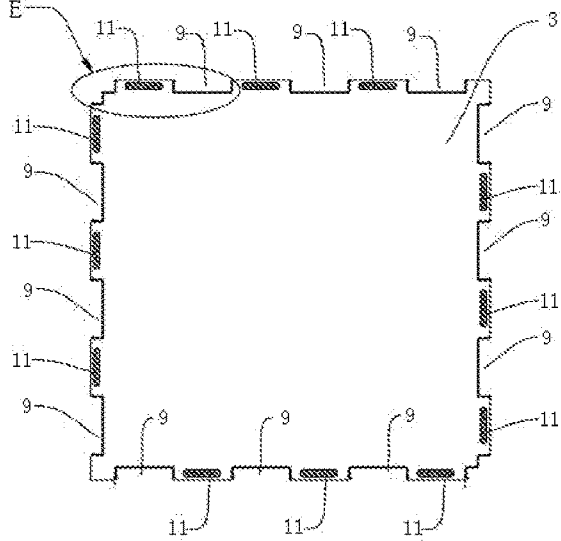
FIG. 23 is diagram two illustrating the structure of a second conductive base in an electrochromic device according to some embodiments of the present invention taken from a viewing angle.
Figure 24:
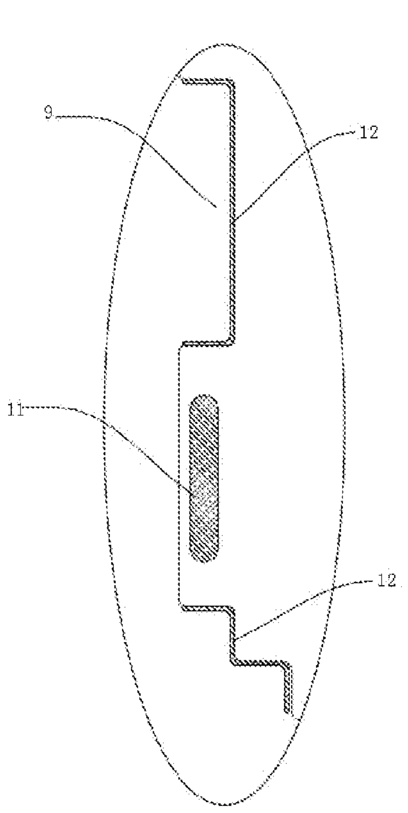
FIG. 24 is an enlarged view of E portion of FIG. 23.
Figure 28:
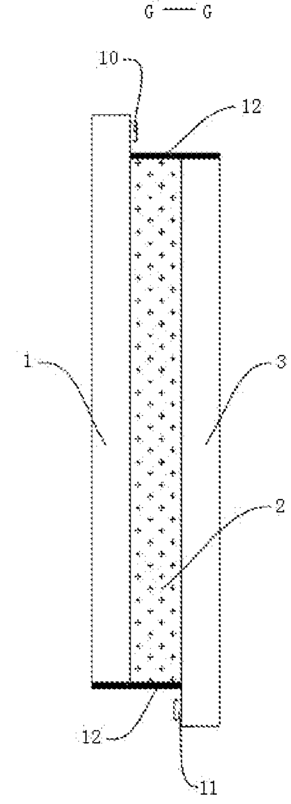
FIG. 28 is a sectional view of G-G portion of FIG. 27.

As shown in FIGS. 20 and 28, in yet another embodiment of the present invention, to prevent the sealant layer 12 disposed in the circumferential direction of the electrochromic layer 2 from extending outside of the first conductive base 1 and the second conductive base 3, an overlapping portion between the orthographic projection of the first conductive base 1 on the plane on which the electrochromic layer 2 is located and the orthographic projection of the second conductive base 3 on the plane on which the electrochromic layer 2 is located covers the electrochromic layer 2 to maximize the effective area of the electrochromic layer 2 located between the first conductive base 1 and the second conductive base 3 so that the utilization rate of the electrochromic layer 2 can be improved.

Figure 18:
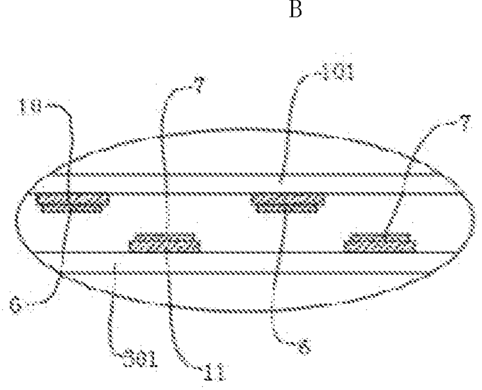
FIG. 18 is an enlarged view of B portion of FIG. 17.
Figure 19:
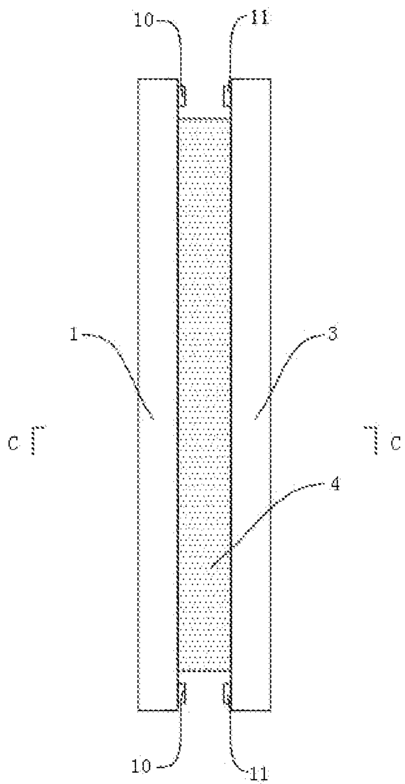
FIG. 19 is diagram five illustrating the structure of an electrochromic device according to some embodiments of the present invention taken from a viewing angle.

It is to be noted that as shown in FIGS. 17 and 18, in this embodiment, the overlapping portion between the orthographic projection of the first conductive layer 101 on the plane on which the electrochromic layer 2 is located and the orthographic projection of the second conductive layer 301 on the plane on which the electrochromic layer 2 is located covers the electrochromic layer 2 to maximize the effective area of the electrochromic layer 2 located between the first conductive layer 101 and the second conductive layer 301.

As shown in FIGS. 3 to 6, in some embodiments of the present application, the electrochromic device includes the first conductive base 1, the electrochromic layer 2 and the second conductive base 3 that are sequentially stacked. The first conductive base 1 includes the first base layer 102 and the first conductive layer 101, the first conductive layer is disposed on one side of the first base layer in proximity to the electrochromic layer, and the first base layer 102 covers the first conductive layer 101 to avoid a short circuit caused by contact between the first conductive layer 101 that is exposed from the side of the first base layer 102 and the external power so that the safety and stability of the first conductive layer 101 on the first base layer 102 can be improved.

In addition, the second conductive base 3 includes the second base layer 302 and the second conductive layer 301, the second conductive layer is disposed on one side of the second base layer in proximity to the electrochromic layer, and the second base layer 302 covers the second conductive layer 301 to avoid a short circuit caused by contact between the second conductive layer 301 that is exposed from the side of the second base layer 302 and the external power so that the safety and stability of the first conductive layer 101 on the second base layer 302 can be improved.

Specifically, the first conductive base 1 and the second conductive base 3 are parallel to each other to form an electric field between the first conductive base 1 and the second conductive base 3 when the first conductive base 1 and the second conductive base 3 are simultaneously connected to the external power, so that a material having a conductive function can form a directional movement of charges under the action of the applied electric field.

As shown in FIGS. 3, 4, 5, 6, 11 and 14, in some embodiments of the present application, at least one side in the circumferential direction of the electrochromic device each is provided with a first busbar 4 and a second busbar 5 to reduce the surface resistance of the electrochromic device and improve the color changing speed of the electrochromic layer 2.

It is to be noted that the first busbar 4 and the second busbar 5 may be disposed on any side of the electrochromic device. In some examples, both the first busbar 4 and the second busbar 5 may be disposed on one opposite side of the electrochromic device.

In addition, both the first busbar 4 and the second busbar 5 may also be disposed on two adjacent sides of the electrochromic device. In some examples, two or more adjacent first busbars 4 may be integrally formed, and two or more second busbars 5 may be integrally formed.

In some other examples, the two or more adjacent first busbars 4 may be mechanically connected, for example, may be connected by any one or a combination of button, snap and welding, and the two or more adjacent second busbars 5 may be mechanically connected, for example, may be connected by any one or a combination of button, snap and welding.

In yet some other examples, the included angle formed by the connection between the two or more first busbars 4 may be specifically limited according to actual situations, the included angle formed by the connection between the two or more second busbars 5 may be specifically limited according to actual situations, and the connection mode between multiple first busbars 4 or between multiple second busbars 5 may be adjusted according to the shape of the electrochromic device to improve the diversity and use efficiency of the multiple first busbars 4 and the multiple second busbars 5.

It is to be understood that one side of the electrochromic device in the circumferential direction of the electrochromic device is provided with the first busbar 4 and the second busbar 5, or any two sides of the electrochromic device in the circumferential direction of the electrochromic device are each provided with the first busbar 4 and the second busbar 5, or any three sides of the electrochromic device in the circumferential direction of the electrochromic device are each provided with the first busbar 4 and the second busbar 5, or each side of the electrochromic device in the circumferential direction of the electrochromic device is provided with the first busbar 4 and the second busbar 5.

Figure 5:
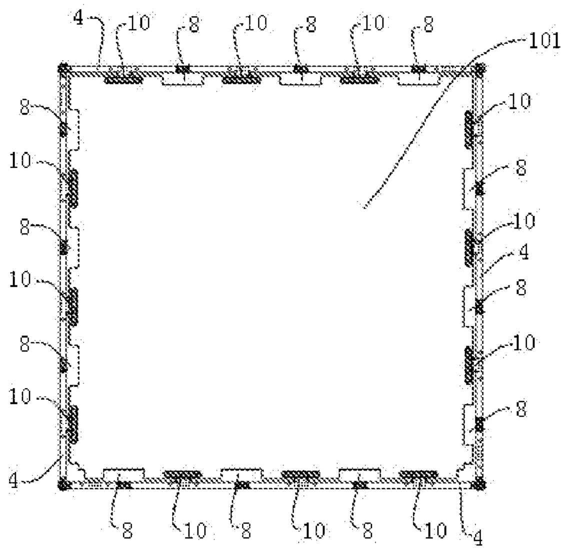
FIG. 5 is diagram one illustrating the structure of a first conductive layer in an electrochromic device according to some embodiments of the present invention taken from a viewing angle.
Figure 9:
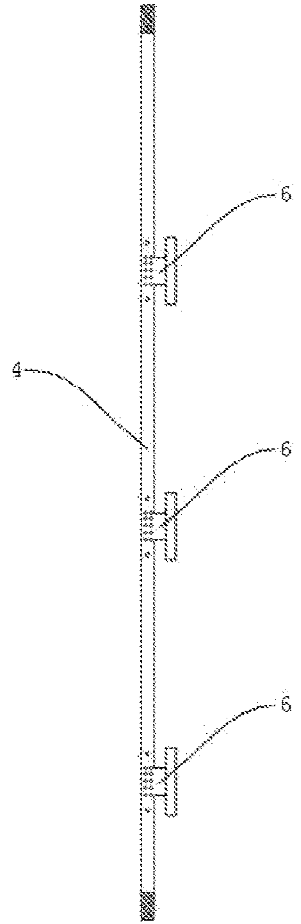
FIG. 9 is diagram one illustrating the structure of a first busbar in an electrochromic device according to some embodiments of the present invention taken from a viewing angle.

As shown in FIGS. 4, 5 and 9, the first busbar 4 is electrically connected to the first conductive layer 101 of the first conductive base 1 by at least one first connecting portion 6 to electrically connect the first busbar 4 to the first conductive base 1 by the at least one first connecting portion 6 and to connect to the external power by the first busbar 4. The connection mode between the first connecting portions 6 and the first conductive segments 10 may be any one of welding, bonding, snap and pressing.

Figure 6:
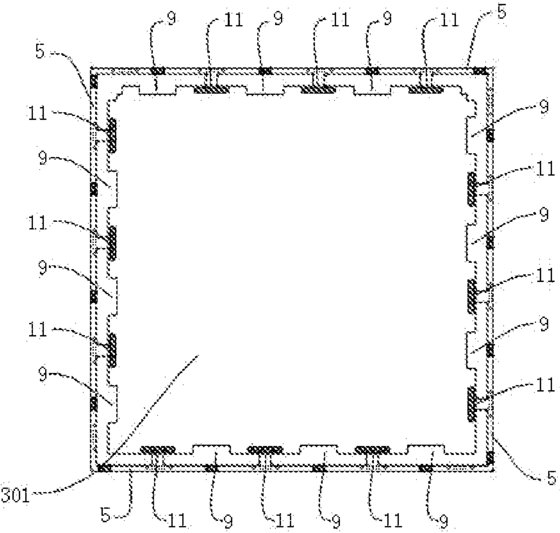
FIG. 6 is diagram one illustrating the structure of a second conductive layer in an electrochromic device according to some embodiments of the present invention taken from a viewing angle.
Figure 7:
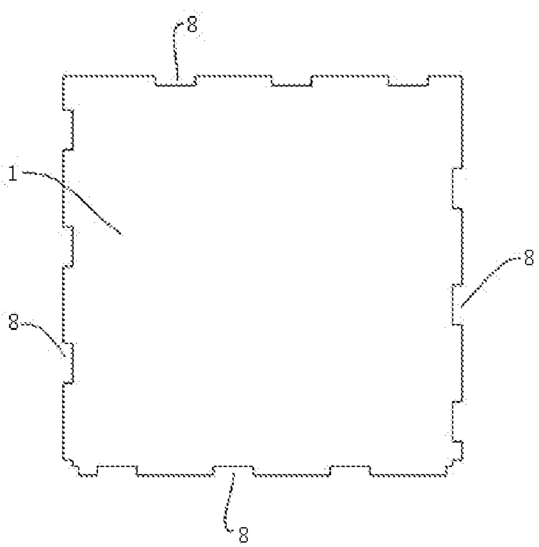
FIG. 7 is diagram one illustrating the structure of a first conductive base in an electrochromic device according to some embodiments of the present invention taken from a viewing angle.
Figure 8:
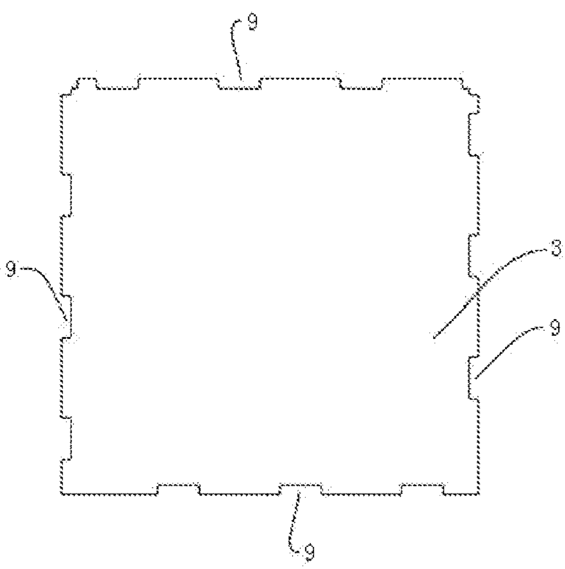
FIG. 8 is diagram one illustrating the structure of a second conductive base in an electrochromic device according to some embodiments of the present invention taken from a viewing angle.
Figure 10:
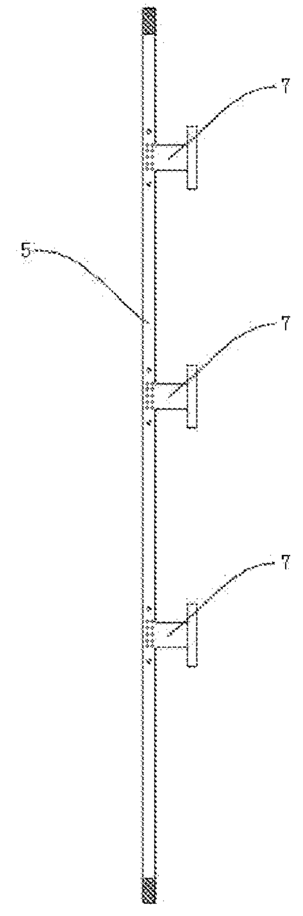
FIG. 10 is diagram one illustrating the structure of a second busbar in an electrochromic device according to some embodiments of the present invention taken from a viewing angle.
Figure 11:
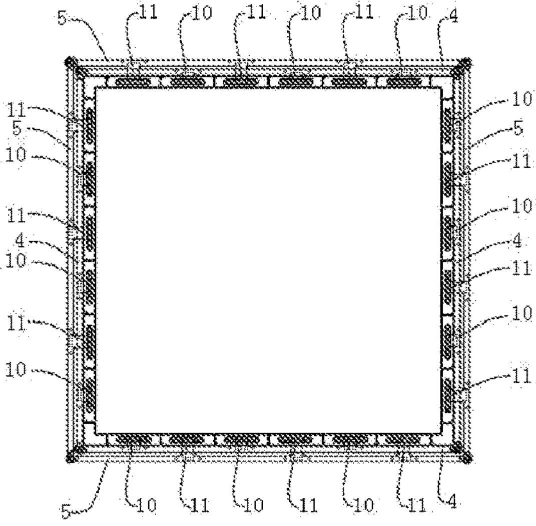
FIG. 11 is diagram two illustrating the structure of an electrochromic device according to some embodiments of the present invention taken from a viewing angle.
Figure 12:
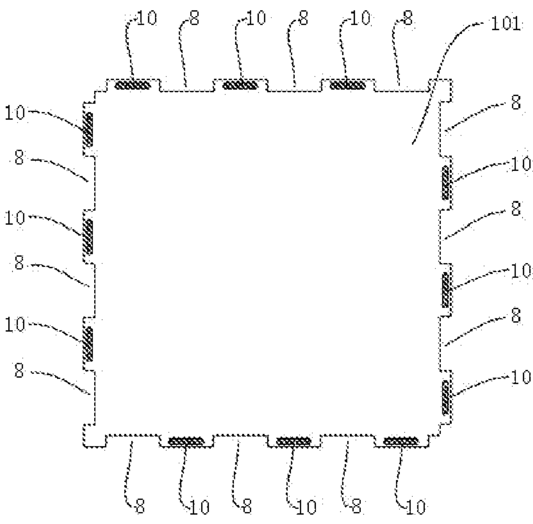
FIG. 12 is diagram two illustrating the structure of a first conductive layer in an electrochromic device according to some embodiments of the present invention taken from a viewing angle.
Figure 13:
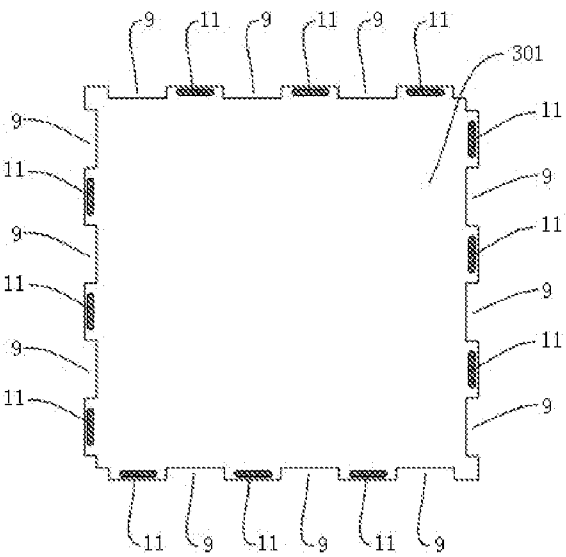
FIG. 13 is diagram two illustrating the structure of a second conductive layer in an electrochromic device according to some embodiments of the present invention taken from a viewing angle.
Figure 14:
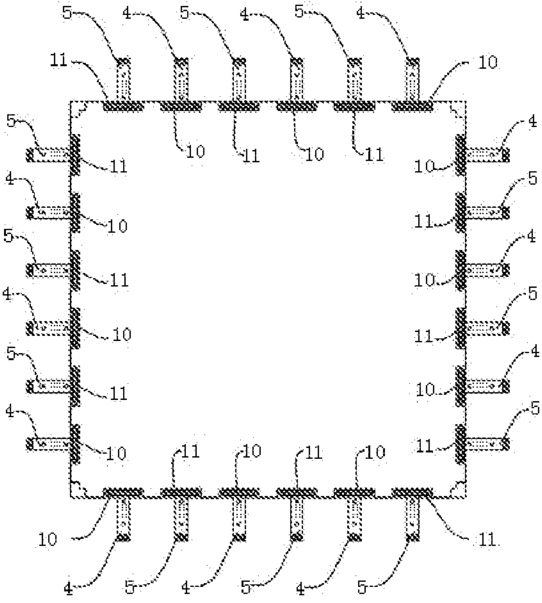
FIG. 14 is diagram three illustrating the structure of an electrochromic device according to some embodiments of the present invention taken from a viewing angle.
Figure 15:
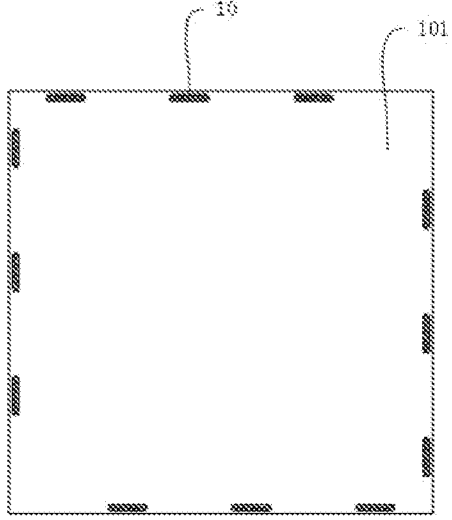
FIG. 15 is diagram three illustrating the structure of a first conductive layer in an electrochromic device according to some embodiments of the present invention taken from a viewing angle.
Figure 16:
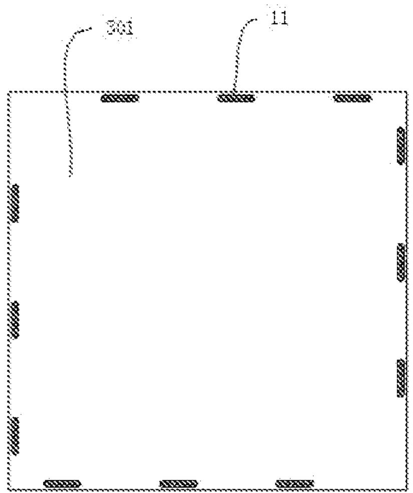
FIG. 16 is diagram four illustrating the structure of a second conductive layer in an electrochromic device according to some embodiments of the present invention taken from a viewing angle.

Meanwhile, as shown in FIGS. 4, 6 and 10, the second busbar 5 is electrically connected to the second conductive layer 301 of the second conductive base 3 by at least one second connecting portion 7 to electrically connect the second busbar 5 to the second conductive base 3 by the at least one second connecting portion 7 and to connect to the external power by the second busbar 5. The connection mode between the second connecting portions 7 and the second conductive segments 11 may be any one of welding, bonding, snap and pressing.

In addition, a clearance is formed between the first conductive base 1 and the orthographic projection of the first busbar 4 on the plane on which the first conductive base 1 is located, and a clearance is formed between the second conductive base 3 and the orthographic projection of the second busbar 5 on the plane on which the second conductive base 3 is located to avoid a short circuit caused by contact between the first busbar 4 and the second busbar 5 and the first conductive base 1 or the second conductive base 3, so that the safety and stability of the electrochromic device can be improved.

It is to be noted that the first busbar 4 and the second busbar 5 are configured to connect to the external power respectively, and the first connecting portions 6 and the second connecting portions 7 are staggered to improve the safety of connecting the first busbar 4 to the first conductive segments 10 and the safety of connecting the second busbar 5 to the second conductive segments 11, reduce the surface resistance of the electrochromic device and improve the color changing speed of the electrochromic layer 2.

In some embodiments of the present application, the circumferential direction of the first connecting portions 6 and the circumferential direction of the second connecting portions 7 are each encased with an insulating layer, two ends of the first connecting portions 6 and two ends of the second connecting portions 7 are each a conductive surface, and the first connecting portions 6 and the second connecting portions 7 are each a conductive wire. Specifically, the material of the first connecting portions 6 and the second connecting portions 7 is any one of copper, aluminum, copper-clad aluminum and copper-clad steel.

It is to be noted that in some embodiments of the present application, each connecting portion is equivalent to a leading-out portion, that is, the each first connecting portion is equivalent to a first leading-out portion, and the each second connecting portion is equivalent to a second leading-out portion.

Meanwhile, the circumferential direction of the each first connecting portion 6 and the circumferential direction of the each second connecting portion 7 are each encased with an insulating layer, and the each first connecting portion 6 and the each second connecting portion 7 are each a conductive wire. Specifically, the material of the each first connecting portion 6 and the each second connecting portion 7 is any one of copper, aluminum, copper-clad aluminum and copper-clad steel.

The material of the insulating layer is not specially limited and may be any material having an insulating characteristic. In some examples, the insulating layer may be any one of PVC (polyvinyl chloride, polyvinyl chloride), PE (polyethylene, polyethylene), PP (polypropylene, polypropylene), fluoroplastic, rubber and mica tape.

Preferably, the circumferential direction of the electrochromic device is each provided with the first busbar 4 and the second busbar 5. Therefore, the first busbar 4 and the periphery of the first conductive base 1 can be electrically connected at the same time, and the second busbar 5 and the periphery of the second conductive base 3 can be electrically connected at the same time, so that the surface resistance of the electrochromic device can be reduced to a greater extent, the color changing efficiency of the electrochromic device can be improved to a greater extent, and the practicability of the electrochromic device can be improved.

As shown in FIGS. 3, 4, 5, 11 and 14, in yet another embodiment of the present invention, to avoid a short circuit caused by contact between the first busbar 4 and the second busbar 5, the orthographic projection of the first busbar 4 on the plane on which the second conductive base 3 is located and the second busbar 5 are spaced apart.

Further, a clearance is formed between the orthographic projections of the first busbar 4 and the second busbar 5 on the plane on which the second conductive base 3 is located to avoid the contact between the first busbar 4 and the second busbar 5, improve the safety and stability in the process of connecting the first busbar 4 and the second busbar 5 to the external power and the safety and stability of the electrochromic device during use.

In yet another embodiment of the present invention, to improve the stability of the electrochromic device, the circumferential direction of the first busbar 4 and the circumferential direction of the second busbar 5 are each encased with an insulating layer to avoid a short circuit caused by the contact between the first busbar 4 and the second busbar 5. Meanwhile, two ends of the first busbar 4 and two ends of the second busbar 5 are each a conductive portion. The disposition of the conductive portions not only can form the electrical connection inside the first busbar 4 or the second busbar 5, but also can form the electrical connection between the first busbar 4 and the external power (for example, the electrical connection to the cathode or anode of the external power) or the electrical connection between the second busbar 5 and the external power (for example, the electrical connection to the anode or cathode of the external power) through the conductive portions to improve the safety and stability when the first busbar 4 and the second busbar 5 are connected to the external power.

In this embodiment, the material of the first busbar 4 and the second busbar 5 is not specially limited. In some examples, the first busbar 4 and the second busbar 5 may be any material having conductivity, for example, a copper wire or a wire formed by drop coating of silver paste, or a FPC (Printed circuit, flexible printed circuit). Therefore, the requirements of busbar characteristics in different application scenarios can be satisfied to improve the applicability of the electrochromic device.

It is to be noted that the electrochromic layer 2 includes an electrochromic material layer, an electrolyte layer and an ion storage layer that are sequentially bonded. The electrochromic material layer, the electrolyte layer and the ion storage layer may use the feasible materials in the related art. This is not specially limited in the present invention.

An embodiment of the present invention further provides an electrochromic apparatus including the preceding electrochromic device. In some examples, the electrochromic apparatus further includes a first substrate layer, a first encapsulation layer, the electrochromic device, a second encapsulation layer and a second substrate layer that are sequentially stacked. In some other examples, the first encapsulation layer and the second encapsulation layer cover the electrochromic device. In this case, the electrochromic device is covered in the two encapsulation layers so that the electrochromic device can be encapsulated more effectively, and the disposition of encapsulation layers and substrate layers can also provide physical support for the busbars in the electrochromic device to prevent the busbars from damage, breakage, or detachment from connecting portions.

In all the examples illustrated and described herein, any specific value is to be construed as being merely exemplary instead of being limiting. Thus, other examples of exemplary embodiments may have different values.

It is to be noted that similar reference numerals and letters indicate similar items in subsequent drawings. Therefore, once some item is defined in one drawing, the item needs no more definition and explanation in the subsequent drawings.

The preceding embodiments are merely several embodiments of the present invention, and the specific and detailed description thereof cannot be understood as a limit to the scope of the present invention. It is to be noted that those of ordinary skill in the art can make several variations and improvements without departing from the concept of the present invention, and such variations and improvements are within the scope of the present invention.

What is claimed is:

1. A conductive base structure, comprising a base body, wherein the base body comprises a first conductive base and a second conductive base that are stacked, wherein the first conductive base and the second conductive base are each configured to connect to an external power, at least one sidewall of the first conductive base in a circumferential direction of the first conductive base is provided with at least one first groove, at least one sidewall of the second conductive base in a circumferential direction of the second conductive base is provided with at least one second groove, and the first groove and the second groove are located on a same side of the base body;

- wherein a plurality of first grooves and a plurality of second grooves are provided, the plurality of first grooves are spaced apart along the circumferential direction of the first conductive base, and the plurality of second grooves are spaced apart along the circumferential direction of the second conductive base;
- the first conductive base comprises a first conductive layer provided with a plurality of first conductive segments, and an orthographic projection of each of the plurality of first conductive segments on a plane on which the second conductive base is located is located in a corresponding one of the second grooves; the second conductive base comprises a second conductive layer provided with a plurality of second conductive segments, an orthographic projection of each of the plurality of second conductive segments on a plane on which the first conductive layer is located is located in a respective one of the plurality of first grooves, and clearances are formed between orthographic projections of the first conductive segments on a plane on which the second conductive layer is located, and the second conductive segments; and the first conductive segments and the second conductive segments are each configured to connect to an external power.

2. The conductive base structure according to claim 1, wherein clearances are formed between orthographic projections of the first grooves on a plane on which the second conductive base is located, and the second grooves, and clearances are formed between orthographic projections of the second grooves on a plane on which the first conductive base is located, and the first grooves.

3. The conductive base structure according to claim 1, wherein orthographic projections of the first grooves on a plane on which the second conductive base is located partially overlap the second grooves, and orthographic projections of the second grooves on a plane on which the first conductive base is located partially overlap the first grooves.

4. An electrochromic device, comprising an electrochromic layer and a conductive base structure, wherein the conductive base structure comprises a base body, wherein the base body comprises a first conductive base and a second conductive base that are stacked, wherein the first conductive base and the second conductive base are each configured to connect to an external power, at least one sidewall of the first conductive base in a circumferential direction of the first conductive base is provided with at least one first groove, at least one sidewall of the second conductive base in a circumferential direction of the second conductive base is provided with at least one second groove, and the first groove and the second groove are located on a same side of the base body;

wherein the electrochromic layer is disposed between the first conductive base and the second conductive base;

wherein a plurality of first grooves and a plurality of second grooves are provided, the plurality of first grooves are spaced apart along the circumferential direction of the first conductive base, and the plurality of second grooves are spaced apart along the circumferential direction of the second conductive base;

the first conductive base comprises a first conductive layer provided with a plurality of first conductive segments, and an orthographic projection of each of the plurality of first conductive segments on a plane on which the second conductive base is located is located in a corresponding one of the second grooves; the second conductive base comprises a second conductive layer provided with a plurality of second conductive segments, an orthographic projection of each of the plurality of second conductive segments on a plane on which the first conductive layer is located is located in a respective one of the plurality of first grooves, and clearances are formed between orthographic projections of the first conductive segments on a plane on which the second conductive layer is located, and the second conductive segments; and the first conductive segments and the second conductive segments are each configured to connect to an external power.

5. The electrochromic device according to claim 4, wherein a sealant layer is provided along a circumferential direction of the electrochromic layer, and the sealant layer is configured to form a seal in the circumferential direction of the electrochromic layer.

6. The electrochromic device according to claim 4, wherein a sealant layer is disposed in the first grooves in a circumferential direction of the first grooves, in the second grooves in a circumferential direction of the second grooves, and on the electrochromic layer in a circumferential direction of the electrochromic layer, and clearances are formed between the sealant layer, and the first conductive segments and the second conductive segments.

7. The electrochromic device according to claim 4, wherein an orthographic projection of each of the first grooves on a plane on which the electrochromic layer is located and an orthographic projection of each of the second grooves on the plane on which the electrochromic layer is located are spaced apart, clearances are formed between the first grooves and the second grooves.

8. The electrochromic device according to claim 4, wherein an orthographic projection of each of the first grooves on a plane on which the electrochromic layer is located and an orthographic projection of each of the second grooves on the plane on which the electrochromic layer is located partially overlap each other, overlapping portions are formed between the first grooves and the second grooves.

9. The electrochromic device according to claim 4, wherein an overlapping portion between orthographic projections of the first conductive base and the second conductive base on a plane on which the electrochromic layer is located covers the electrochromic layer.

10. An electrochromic device, comprising a first conductive base, an electrochromic layer and a second conductive base that are sequentially stacked, wherein the first conductive base comprises a first base layer and a first conductive layer, and the first conductive layer is disposed on one side of the first base layer in proximity to the electrochromic layer; the second conductive base comprises a second base layer and a second conductive layer, and the second conductive layer is disposed on one side of the second base layer in proximity to the electrochromic layer; at least one side of the electrochromic device in a circumferential direction of the electrochromic device is provided with both a first busbar and a second busbar, the first busbar is electrically connected to the first conductive layer by at least one first connecting portion, and the second busbar is electrically connected to the second conductive layer by at least one second connecting portion; a clearance is formed between the first conductive base and an orthographic projection of the first busbar on a plane on which the first conductive base is located; and a clearance is formed between the second conductive base and an orthographic projection of the second busbar on a plane on which the second conductive base is located;

wherein an edge of the first conductive base is provided with a plurality of first grooves that are spaced apart, and an edge of the second conductive base is provided with a plurality of second grooves that are spaced apart;

wherein the first conductive base comprises the first conductive layer provided with a plurality of first conductive segments, and an orthographic projection of each of the plurality of first conductive segments on the plane on which the second conductive base is located is located in a corresponding one of the second grooves; the second conductive base comprises the second conductive layer provided with a plurality of second conductive segments, an orthographic projection of each of the plurality of second conductive segments on a plane on which the first conductive layer is located is located in a respective one of the first grooves, and clearances are formed between orthographic projections of the first conductive segments on a plane on which the second conductive layer is located, and the second conductive segments; and the first conductive segments and the second conductive segments are each configured to connect to an external power.

11. The electrochromic device according to claim 10, wherein a clearance is formed between orthographic projections of the first busbar and the second busbar on the plane on which the second conductive base is located.

12. The electrochromic device according to claim 10, wherein the first busbar is electrically connected to the first conductive segments by the at least one first connecting portion, and the second busbar is electrically connected to the second conductive segments by the at least one second connecting portion.

13. The electrochromic device according to claim 10, wherein the first busbar is encased with an insulating layer in a circumferential direction of the first busbar, the second busbar is encased with an insulating layer in a circumferential direction of the second busbar, and two ends of the first busbar and two ends of the second busbar are all conductive portions.

14. The electrochromic device according to claim 10, wherein the at least one first connecting portion is encased with an insulating layer in a circumferential direction of the at least one first connecting portion, and the at least one second connecting portion is encased with an insulating layer in a circumferential direction of the at least one second connecting portion.

15. An electrochromic apparatus, comprising a first substrate layer, a first encapsulation layer, the electrochromic device according to claim 10, a second encapsulation layer and a second substrate layer that are sequentially stacked, wherein the first encapsulation layer and the second encapsulation layer cover the electrochromic device.

* * * * *